United States Patent [19]

Cole

[11] Patent Number: 4,607,659
[45] Date of Patent: Aug. 26, 1986

[54] VALVE WITH RESILIENT TUBES HAVING CONSTRICTED PORTIONS

[76] Inventor: George S. Cole, 17 Mile Dr., Pebble Beach, Calif. 93953

[21] Appl. No.: 764,541

[22] Filed: Aug. 12, 1985

[51] Int. Cl.⁴ .................. F16K 43/00; F16K 11/18; F16K 31/524
[52] U.S. Cl. .................. 137/454.2; 137/454.6; 137/606; 137/636; 137/636.4; 137/801; 251/4; 251/8
[58] Field of Search .................. 137/606, 636, 636.4, 137/801, 315, 454.2, 454.6; 251/4, 6, 7, 8; 604/250

[56] References Cited

U.S. PATENT DOCUMENTS 3,436,054 4/1969 Cole et al. .................. 251/8

FOREIGN PATENT DOCUMENTS 1023320 3/1953 France .................. 251/8
179527 2/1936 Switzerland .................. 251/8
2067724 7/1981 United Kingdom .................. 137/606

Primary Examiner—G. L. Walton
Attorney, Agent, or Firm—Emrich & Dithmar

[57] ABSTRACT

The valve has flexible resilient tubes which respectively communicate with the fluid supply conduits and which are pinched by control members to control fluid flow. Each tube has a reduced-diameter center or neck portion intermediate its ends which is engaged by the control member. The internal cross section of the neck portion is circular when relaxed and when pinched closed does not require any greater cross-sectional space than do the tube ends. Single-control and dual-control embodiments are disclosed. In the dual-control embodiment the two tubes are carried in a single cartridge assembly which is removable as a unit.

20 Claims, 13 Drawing Figures

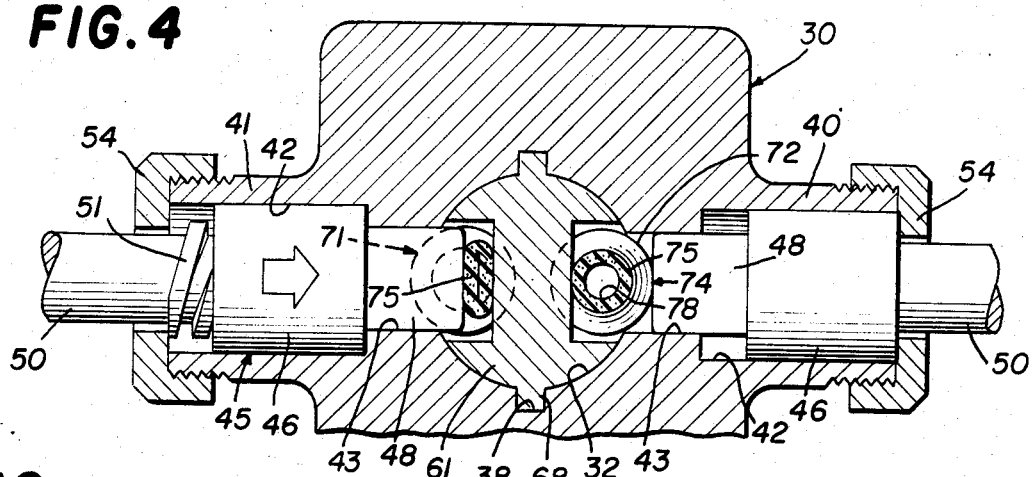
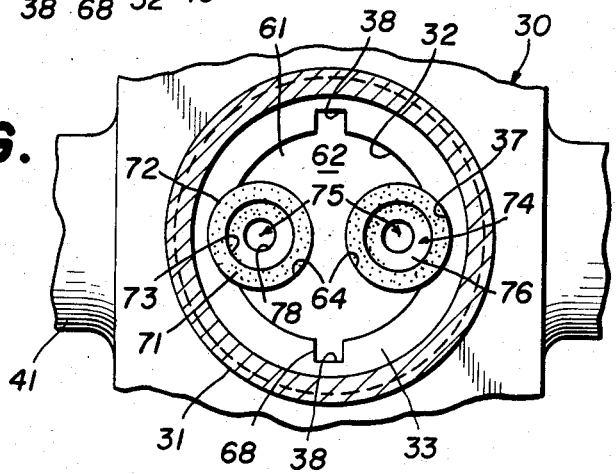
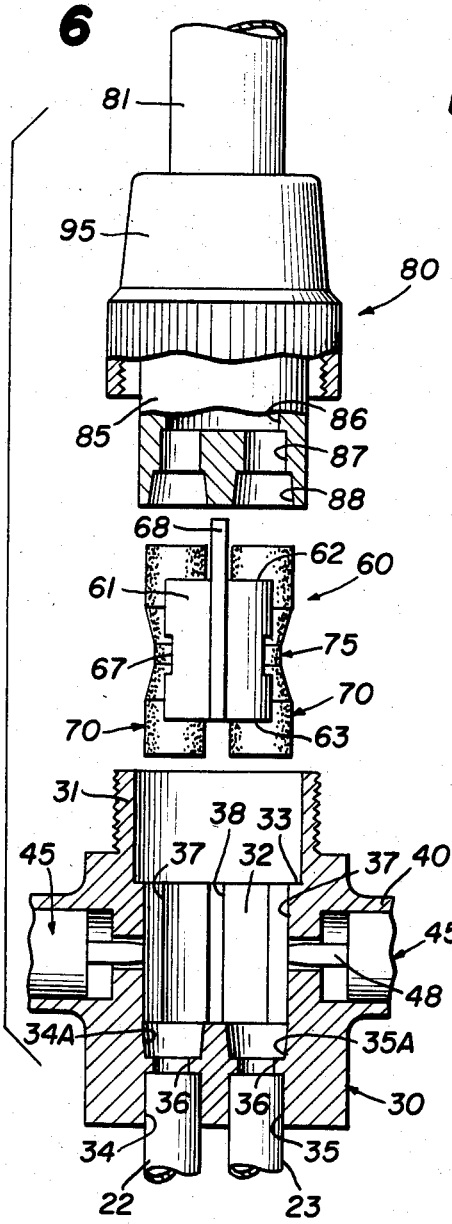
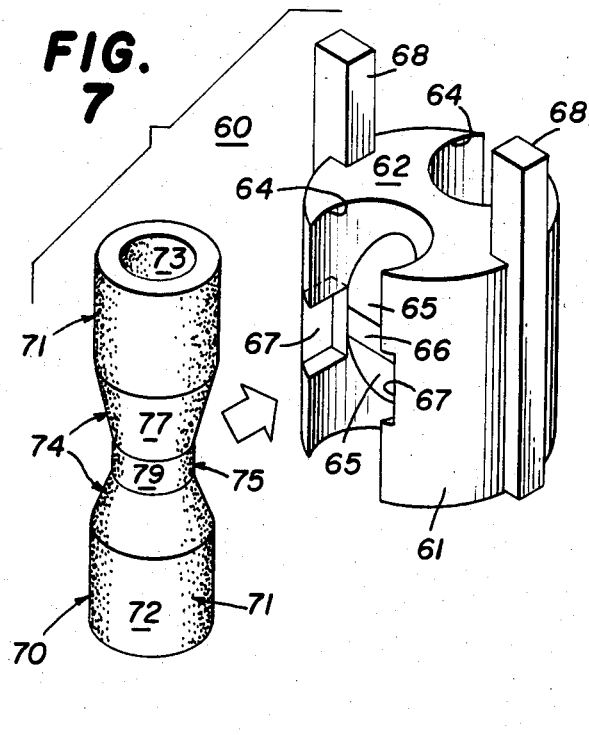

VALVE WITH RESILIENT TUBES HAVING CONSTRICTED PORTIONS

BACKGROUND OF THE INVENTION

The present invention relates to mixing and proportioning valves, such as for hot and cold water faucets, and more particularly to such valves of the type wherein the fluid flows through flexible valve tubes which are compressed or pinched by a valve member to vary the fluid flow.

This general type of valve is disclosed, for example, in my U.S. Pat. No. 4,359,067, which is a single control proportioning valve utilizing an elongated cam member which moves axially between the two tubes between extended, fully open and retracted fully closed positions for varying the total flow, and is also rotatable about its axis for selectively proportioning the flow between the two tubes. In that device, the tubes, in their as-fabricated or fully relaxed condition, are circularly cylindrical straight tubes. In use, the cam member always bears against the valve tubes, even in the fully-open position of the cam member, so that the valve tubes are at least partially compressed or pinched, resulting in a reduced flow area which has a flattened cross section, even in the fully-open position. This arrangement is necessary to limit the axial distance that the valve member must move between the fully open and fully closed conditions of the valve, otherwise the valve would be undesirably large.

In that prior type of flexible tube valve, when the valve tubes are pinched or compressed, the flattened ends project outwardly beyond the relaxed outer diameter of the valve tube, requiring a larger space in the valve body to accommodate the valve tubes in their pinched or closed conditions. This places a lower limit on the size of the valve assembly and militates against miniaturization thereof.

Another disadvantage of this prior type of flexible tube valve is that, while it is less noisy than other types of valves, there is still some noise. The camming surface of the cam member has a generally frustoconical portion and, as it moves from the fully open to the fully closed position it tends to close the upper portion of the valve tube before the lower portion, resulting in a generally teardrop-shaped opening. This results in some turbulence which can create a noise in the valve.

In prior dual control valves of the flexible tube type, each flexible tube is carried in a separate cartridge assembly which must be separately installed and removed. Furthermore, access to these cartridges in prior dual control valves has been fairly difficult, requiring disassembly of other parts of the valve with the use of tools.

Another problem with prior single-control valves of the flexible tube type is that the internal fluid pressure in the valve tubes counters the pinching action of the cam member when it is in the open position and tends to pop the cam member out to a fully open position. Since the desired normal rest condition for a faucet valve is in the fully closed condition, this necessitates a valve construction which tends to hold itself in the closed condition. The force required to effect this holding action must, of course, be overcome by the user in opening the valve, which militates against ease of valve operation.

SUMMARY OF THE INVENTION

It is a general object of the present invention to provide an improved mixing or proportioning valve which avoids the disadvantages of prior valve devices while affording additinal structural and operating advantages.

An important object of the invention is the provision of a valve of the type set forth which utilizes compressible flexible tubes, but which effectively minimizes clogging of the valve by fluid-borne debris.

It is another object of the invention to provide a valve of the type set forth, which minimizes the space required to accommodate the flexible tube elements.

Yet another object of the invention is the provision of a valve of the type set forth which minimizes the distance which the valve actuating members must move between the fully open and fully closed positions, without substantially inhibiting the flow volume in the fully open condition.

Still another object of the invention is the provision of a valve of the type set forth which is relatively quiet in operation.

Another object of the invention is the provision of a valve of the type set forth which is characterized by smooth and easy operation.

In connection with the foregoing object, it is another object of the invention to provide a single control proportioning valve of the type set forth which substantially eliminates the pop-out pressure exerted on the valve actuating member by the flexible tube.

It is still another object of the invention to provide a dual-control mixing valve of the type set forth which utilizes only a single cartridge unit for the flexible tubes.

In connection with the foregoing objects, another object of the invention is the provision of a dual-control mixing valve of the type set forth, wherein the cartridge is readily accessible without the use of tools.

These and other objects of the invention are attained by providing a valve for controlling flow from a pair of pressurized fluid supply conduits, the valve comprising: a support, a pair of spaced resilient circularly cylindrical tubes carried by the support and respectively communicating with the supply conduits, each of the tubes having end portions separated by a neck portion such that when the tube is relaxed the internal diameter of the neck portion is substantially less than that of either of the end portions, and control means on the support engageable with the neck portions of the tubes and movable between an open position wherein the tubes are relaxed and closed positions cooperating with the support to pinch the neck portions for varying the internal cross-sectional areas thereof.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there are illustrated in the accompanying drawings preferred embodiments thereof, from an inspection of which, when considered in connection with the following description, the invention, its construction and operation, and many of its advantages should be readily understood and appreciated.

FIG. 4 is a fragmentary view in horizontal section taken along the line 4—4 in FIG. 3;

FIG. 5 is a fragmentary view in horizontal section taken along the line 5—5 in FIG. 3, with the spout assembly removed;

FIG. 6 is a partially exploded, fragmentary view in partial vertical section of the valve assembly of FIG. 2;

FIG. 7 is a further enlarged, exploded, perspective view of the cartridge assembly illustrated in FIG. 6;

DESCRIPTION OF THE PREFERRED EMBODIMENTS

Figures 1, 2, 3:
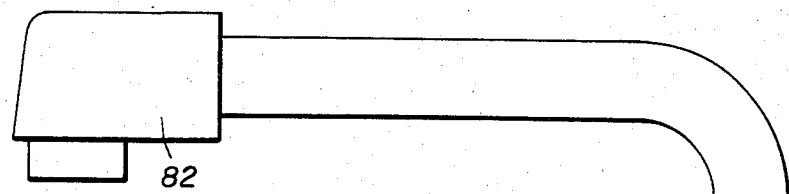
FIG. 1 is a side elevational view of a dual control valve assembly incorporating a mixing valve in accordance with a first embodiment of the present invention.
FIG. 2 is an enlarged, fragmentary view in vertical section taken along the line 2—2 in FIG. 1, and illustrating both controls in the fully open condition.
FIG. 3 is a further enlarged, fragmentary, sectional view a portion of the valve assembly illustrated in FIG. 2, with one of the control members in its fully closed condition.
Figure 8:
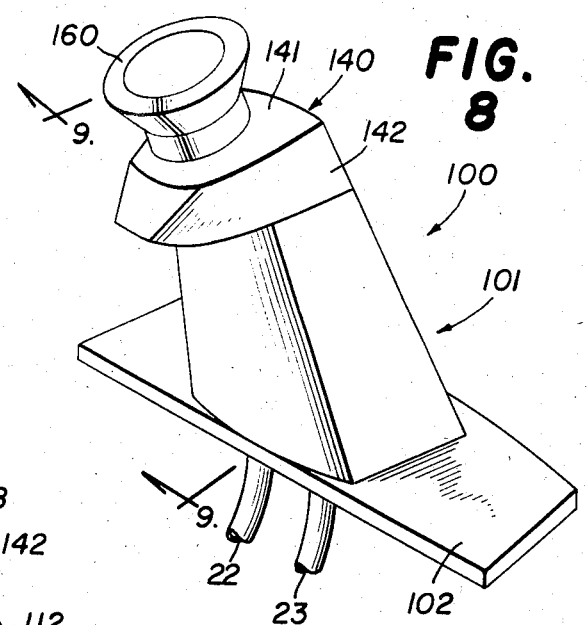
FIG. 8 is a perspective view of a single-control valve assembly incorporating a proportioning valve in accordance with a second embodiment of the present invention.
Figure 9:
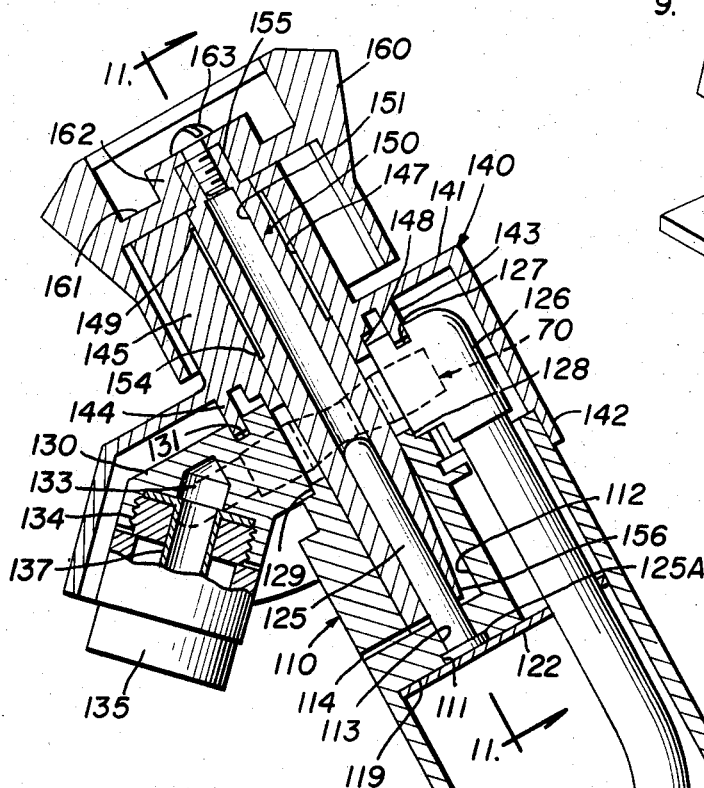
FIG. 9 is an enlarged, sectional view taken along the line 9—9 in FIG. 8, illustrating the valve control in its fully closed condition.
Figure 10:
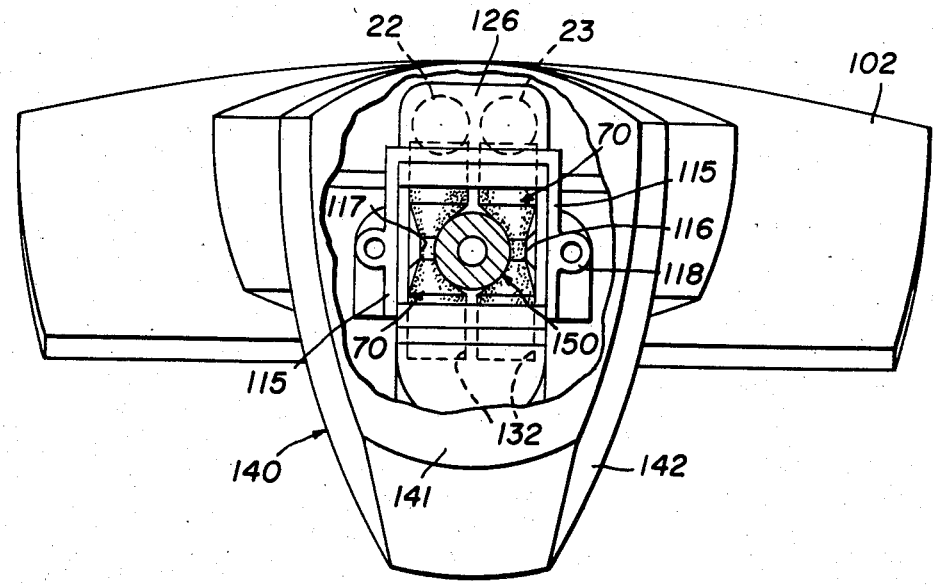
FIG. 10 is a plan view of the valve assembly of FIG. 9, with portions broken away more clearly to illustrate the valve construction.

Referring to FIGS. 1-7, there is illustrated a dual control faucet valve assembly 20, which comprises a mixing valve assembly constructed in accordance with and embodying the features of a first embodiment of the present invention. The valve assembly 20 includes an escutcheon 21 which is mounted on the top of a sink or the like and receives through complementary openings therein two pressurized fluid supply conduits 22 and 23, such as hot and cold water supply lines. The valve assembly 20 includes a support body 30 which is mounted on the escutcheon 21 and has an upstanding externally threaded outlet neck 31.

Extending coaxially through the outlet neck 31 and into the support body 30 is a substantially circularly cylindrical cavity or receptacle 32 (see FIG. 5), the upper end of which is counterbored to define an annular shoulder 33. Formed in the bottom of the support body 30 and communicating with the receptacle 32 are two passages 34 and 35, in which are respectively received the upper ends of the supply conduits 22 and 23 (see FIG. 6). Each of the passages 34 and 35 has a radially inwardly extending annular flange 36 midway between the upper and lower ends thereof, against which the upper end of the associated supply conduit 22 or 23 is stopped. If desired, the supply conduits 22 and 23 may be secured in the bores 34 and 35, as by soldering or the like. The upper ends of the passages 34 and 35 respectively define tapered portions 34A and 35A, each provided with an approximately 5° taper and diverging upwardly into the receptacle 32. Formed in the inner surface of the receptacle 32 at diametrically spaced-apart locations thereon are part-cylindrical recesses 37 (FIGS. 5 and 6). Also formed in the inner surface of the receptacle 32 at diametrically opposed locations midway between the recesses 37 are two elongated keyways 38, each substantially rectangular in transverse cross section. The recesses 37 and the keyways 38 extend axially from the shoulder 33 to the bottom of the receptacle 32, and have a radial depth less than that of the annular shoulder 33.

The support body 30 also has a pair of cylindrical, externally-threaded legs 40 and 41 extending respectively from opposite sides thereof. Each of the legs 40 and 41 has a cylindrical axial bore 42 extending thereinto, the inner end of the bore 42 communicating with the cavity 32 via a rectangular slot 43, the bores 42 and slots 43 being arranged coaxially with each other and radially of the cavity 32.

Two control members 45 are respectively received in the bores 42, each of the control members 45 having a cylindrical, internally-threaded side wall 46 closed at the inner end thereof by a circular end wall 47. Integral with the end wall 47 and projecting axially from the outer surface thereof centrally thereof is a rectangular pinch finger 48, dimensioned and positioned to extend through the associated slot 43. The control member 45 is disposed for sliding axial movement within the bore 42. Each control member 45 is provided with an actuator shaft 50 having external threads 51 at one end thereof adapted for threaded engagement in the cylindrical side wall 46. The shaft 50 has an externally knurled outer end 52 (FIG. 2), and extends through an opening 53 in a cap 54 which is threadedly engaged with the associated one of the legs 40 or 41 for closing the outer end thereof.

Each of the actuator shafts 50 is provided at its outer end with a handle 55 which is generally frustoconical in shape and is closed at its outer end by a circular web 56. A cylindrical hub 57 projects inwardly from the web 56 and receives therein in press-fitted relationship the knurled outer end 52 of the shaft 50, being fixedly secured thereto by a screw 58 which is engaged in an axial bore (not shown) in the shaft 50. Each of the handles 55 is provided with a generally radially outwardly extending indicator tab 59 for indicating the condition of the associated valve.

The faucet assembly 20 also includes a cartridge assembly 60 which is receivable in the receptacle 32. Referring in particular to FIGS. 6 and 7, the cartridge assembly 60 includes a generally cylindrical body 61 having upper and lower parallel circular end faces 62 and 63. Formed in opposite sides of the body 61 and extending parallel to the longitudinal axis thereof between the end faces 62 and 63 are two partcylindrical recesses 64. Provided at the inner portion of each recess 64 midway between the ends thereof are a pair of inclined bearing surfaces 65 interconnected by a flat rectangular bearing surface 66, the inclined bearing surface 65 sloping radially outwardly toward the flat bearing surface 66 from the opposite ends of the recess 64. Formed in the opposite sides of each of the recesses 64 intermediate the ends thereof are two rectangular side notches or recesses 67, the inner ends of the recesses 67 being substantially coplanar with the flat bearing surface 66 and parallel to the longitudinal axis of the body 61. Integral with the body 61 at diametrically opposed locations thereon midway between the recesses 64 are two rectangular keys 68, each projecting radially outwardly from the body 61 and extending longitudinally from the lower end face 63 to a level a predetermined distance above the upper end face 62.

The cartridge assembly 60 also includes a pair of circularly cylindrical, flexible, compressible valve tubes 70 which are dimensioned to be snugly received respectively in the part-cylindrical recesses 64. Each of the valve tubes 70 has a pair of identically shaped end portions 71, each having a cylindrical outer surface 72 and a cylindrical inner surface 73. The end portions 71 are respectively coupled by generally frustoconical tapered portions 74 to a reduced-diameter neck portion 75. The tapered portions 74 preferably have identical conical angles and are of equal axial extent, each having an inner surface 76 and an outer surface 77 (FIGS. 3 and 7), the neck portion 75 having a cylindrical inner surface 78 and a cylindrical outer surface 79 (FIGS. 4 and 5). The inner surfaces 73, 76 and 78 all cooperate to form a continuous inner surface for the valve tube 70.

In use, the valve tubes 70 are respectively snugly received in the part-cylindrical recesses 64 of the cartridge body 61, the bearing surfaces 65 and 66 being designed to conform to the axial curvature of the outer surfaces (77 and 79) of the tubes 70. Thus, as is best seen in FIG. 3, the neck portions 75 and the tapered portions 74 of the valve tubes 70 respectively lie tangentially against the bearing surfaces 66 and 65. The valve tubes 70 have an axial extent greater than that of the body 61 so as to project equidistantly above and below the end faces 62 and 63, as can best be seen in FIG. 6.

When the cartridge assembly 60 has been assembled by mounting the valve tubes 70 in the body recesses 64, the cartridge assembly 60 is then dropped into the cavity 32 to a mounted condition illustrated in FIGS. 2 and 3, with the keys 68 being respectively received in the keyway 38, and with the part-cylindrical recesses 37 accommodating the portions of the valve tubes 70 which project radially outwardly beyond the outer surface of the body 61. The lower ends of the valve tubes 70 are respectively received in the tapered portions 34a and 35A of the passages 34 and 35, being wedged therein and then stopped against the annular flanges 36, and the lower end face 63 of the body 61 rests upon the bottom of the cavity 32, with the upper ends of the valve tubes 70 projecting above the shoulder 33.

The valve assembly 20 also includes a spout assembly 80 having an elongated, generally L-shaped spout 81, provided at the outer end thereof with an aerator assembly 82. The inner end of the spout 81 has a circumferential groove 83 in the outer surface thereof for receiving therein a sealing O-ring 84, disposable in sealing relationship with an internal cylindrical sealing surface 86 of a cylindrical sleeve 85, which is telescopically received over the inner end of the spout 81 (see FIG. 2). The sleeve 85 is closed at its lower end by an end wall which is provided with a pair of cylindrical passages 87 therethrough, each having an enlarged tapered portion 88 at its outer end. The upper end of the sleeve 85 has a counterbore 89. Received in this upper counterbore 89 is a cylindrical bearing 90, having a radially inwardly extending annular lip 91 which is disposable in a circumferential groove 92 in the outer surface of the spout 81, the bearing 90 facilitating rotational movement of the spout 81 about its axis with respect to the sleeve 85.

In use, the assembly of the spout 81, the bearing 90 and the sleeve 85 are received axially into the upper end of the cavity 32, being snugly received in the counterbored portion thereof, with the lower end of the sleeve 85 seating upon the shoulder 33, and the upper ends of the valve tubes 70 being respectively received in the tapered portions 88 of the passages 87 and wedged therein for providing communication between the valve tubes 70 and the spout 81. The spout assembly 80 is held in place by a nut 95 which is telescopically received over the outer end of the sleeve 85 and is threadedly engaged with the outlet neck 31 of the support body 30, a radially inwardly extending retaining shoulder 96 on the nut 95 engaging the outer end of the sleeve 85 for securely holding the spout assembly 80 in place.

The operation of the valve assembly 20 will now be described in detail. It can be seen that when the cartridge assembly 60 is disposed in its mounted condition in the cavity 32, the neck portions 75 of the flexible valve tubes 70 are respectively disposed directly opposite the ends of the pinch fingers 48 of the control members 45. Rotation of the handles 55 respectively causes an axial movement of the control members 45 through the screw mechanism, rotation of the control members 45 being prevented by disposition of the rectangular pinch fingers 48 in the rectangular slots 43. Thus, each of the control members 45 is independently movable axially between a fully open position, illustated in FIG. 2, and a fully closed position, illustrated at the left-hand side of FIGS. 3 and 4.

It can be seen that when the control member 45 is moved from its fully open position toward its fully closed position, the inner end of the pinch finger 48 engages the neck portion 75 of the associated one of the flexible valve tubes 70, for cooperation with the bearing surface 66 to compress or pinch the neck portion 75 therebetween, thereby constricting the flow passage through the neck portion 75 for varying the fluid flow therethrough. The width of the end face of the pinch member 48, which is greater than the outer diameter of the neck portion 75 of the valve tube 70, is accommodated in the associated recesses 67. When the control member 45 is disposed in its fully closed condition, the neck portion 75 of the valve tube 70 is completely pinched shut, as illustrated at the left-hand side of FIGS. 3 and 4, for closing the valve and terminating flow through the valve tube 70.

It is a significant aspect of the present invention that, when the valve is fully open and the flexible valve tube 70 is in a completely relaxed condition, the inner and outer diameters of the neck portion 75 are substantially less than those of the end portions 71. This is important, because it means that the radial distance that the neck portion 75 must be moved between the fully open and fully closed conditions is minimized, thereby minimizing the travel of the control members 45 and, thus, the lengths of the legs 40 and 41, permitting a significantly reduced size valve assembly.

Furthermore, it is important that the reduceddiameter neck portion 75 does not significantly impair the flow of liquid through the valve tube 70. More particularly, the valve tube 70 is constructed to operate substantially like a Venturi tube, resulting in a reduced pressure and an increased fluid velocity through the neck portion 75. This may result in a slight reduction of from 10 to 20% in the output flow, but this difference in flow is substantially less than the difference in diameter between the neck portion 75 and the end portions 71. Also, because of the reduced pressure in the neck portion 75, the valve tube 70 exerts a reduced reaction force on the control member 45 when it is compressing the neck portion 75, thereby resulting in an easier overall valve operation.

It is also significant that when the flexible valve tube 70 is in its completely relaxed condition, the flow passage through the neck portion 75 is circular in shape, maximizing the cross-sectional flow area. This serves to minimize the chance of loose debris particles in the fluid stream becoming clogged in the neck portion 75.

Also, it will be noted that the dimensions of the neck portion 75 are such that when it is pinched to its fully closed condition, illustrated in FIG. 4, the outline of its external perimeter lies completely within the external perimeter outline of the end portions 71. Thus, the space which must be provided in the valve assembly 20 to accommodate the valve tube 70 is limited by the outer diameter of the end portions 71, which also facilitates miniaturization of the valve assembly 20.

It will also be noted that, because the pinch finger 48 moves into engagement with the neck portion 75 radially thereof, the neck portion 75 is closed symmetrically and uniformly across its transverse cross section, avoiding the formation of a teardrop-shaped opening and thereby significantly reducing turbulence and concomitant valve noise.

It is another important aspect of the valve assembly 20, that the two flexible valve tubes 70 are mounted in a single cartridge assembly 60, which can be inserted in and removed from the support body 30 as a unit, greatly facilitating maintenance and repair of the valve assembly 20. It is also significant that the cartridge assembly 60 is exposed by simply removing the spout assembly 80, which is also removable as a unit. Thus, in order to gain access to the cartridge assembly 60, it is only necessary to unscrew the nut 95, which may be done manually, thereby permitting the spout assembly 80 to be pulled off as a unit, without the use of tools, and exposing the cartridge assembly 60 for easy removal. The handles must be in the open position before the cartridge can be removed. Thus, there is provided a dual-control mixing valve with only a single valve cartridge.

In a constructional model of the valve assembly 20, the support body 30 is formed of brass or plastic and the flexible valve tubes 70 are formed of a rubberlike material, such as an EPDM compound. The spout 81 is formed of a suitable metal such as brass, and the nut 95 may be formed of brass or a plastic such as platable ABS. The caps 54 and the handles 55 are formed of a platable plastic, such as ABS, and the remaining parts of the valve assembly 20 are formed of a plastic material, such as an acetyl copolymer of the type sold by Celanese Plastics & Specialties Co. under the trademark "CELCON". While the foregoing materials are disclosed in the preferred embodiment, for purposes of illustration, it will be understood that other suitable materials could be utilized, depending upon the particular application.

Referring now to FIGS. 8–13, there is illustrated a single control proportioning faucet valve assembly 100 in accordance with a second embodiment of the present invention. The valve assembly 100 includes a lower housing 101 having a flat, generally rectangular escutcheon plate 102 adapted to be mounted on an associated counter or sink over the upper ends of the fluid supply conduits 22 and 23.

Integral with the lower housing 101 adjacent to the upper end thereof is a support body 110. The support body 110 projects upwardly a predetermined distance above the upper end of the lower housing 101 and has a cylindrical axial bore or receptacle 112 extending thereinto from the upper end thereof. A smaller cylindrical bore 113 and a counterbore 111 provides communication between the lower end of the receptacle 112 and the hollow lower end of the lower housing 101. The bottom of the receptacle 112 also communicates to the outside of the lower housing 101 through a small vent bore 114 formed in the front wall of the lower housing 101. Integral with the support body 110 at the upper end thereof and projecting upwardly therefrom are two laterally spaced apart side plates 115 (see FIG. 10) disposed parallel to each other, and each provided on its inner surface with a bearing boss 116 having a flat, rectangular bearing surface 117 thereon. Integral with each of the side plates 115 at the upper end thereof is an attachment boss 118.

Figure 11:
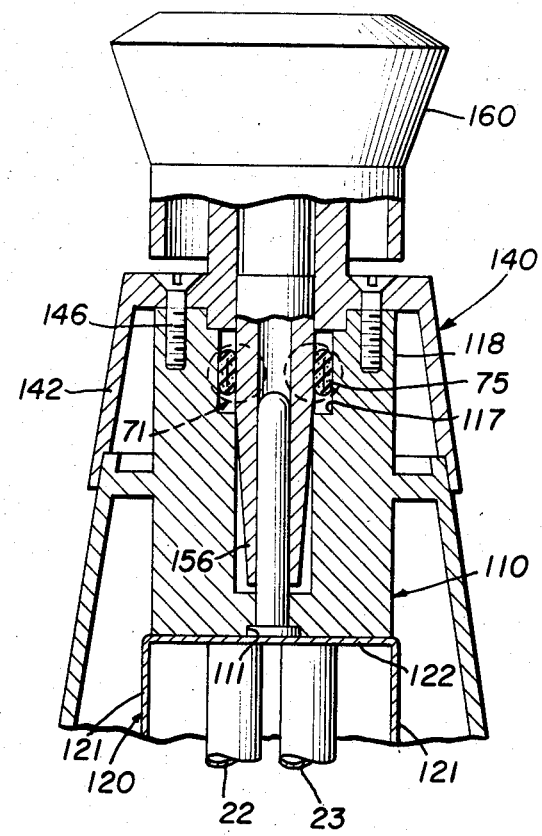
FIG. 11 is a fragmentary, sectional view taken along the line 11—11 in FIG. 9.
Figure 12:
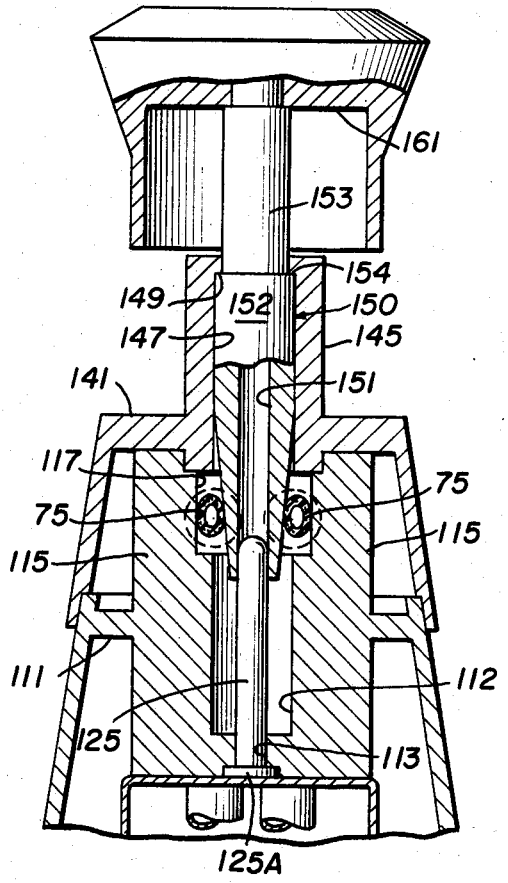
FIG. 12 is a view similar to FIG. 11, illustrating the valve in its fully open condition.
Figure 13:
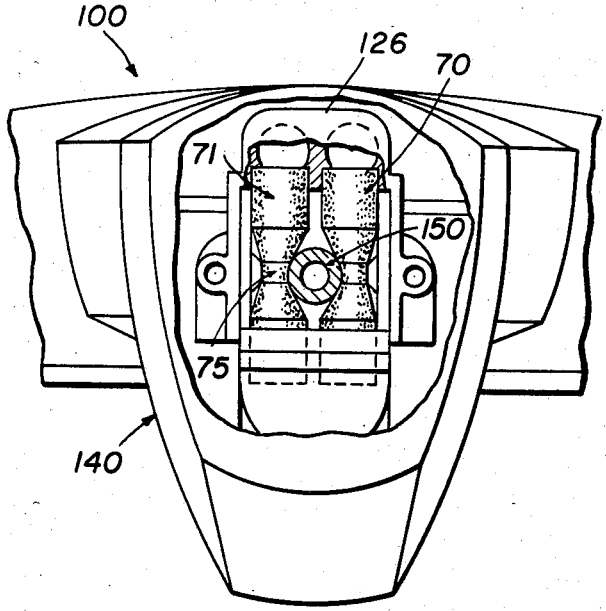
FIG. 13 is a fragmentary view similar to FIG. 10, and illustrating the valve in its fully open condition of FIG. 12.

The support body 110 has a flat bottom surface 119 adapted to rest upon a pedestal 120 (FIG. 11). More particularly, the pedestal 120 has a pair of laterally spaced-apart legs 121 interconnected at the upper ends thereof by a bight 122 which engages the bottom surface 119 of the support body 110 and may be fixedly secured thereto by suitable means. Each of the legs 121 has an outturned foot (not shown) which extends under the associated portion of the escutcheon plate 102. An elongated upstanding guide shaft 125, circular in transverse cross section, is dimensioned to fit through the bore 113 in the support body 110 and extends well up into the receptacle 112 axially thereof, for a purpose to be explained more fully below. The guide shaft 125 has a circular foot 125A which is received in the counterbore 111 and held in place by the bight 122 of the pedestal 120.

Each of the supply conduits 22 and 23 extends upwardly into the lower housing 101, through complementary openings in the bight 122. The upper ends of the supply conduits 22 and 23 are coupled to an elbow fitting 126 which has a groove 127 in the upper end thereof. The elbow fitting 126 is disposed against a stop flange 128 on the rear of the support body 110 between the side plates 115. Two of the flexible valve tubes 70 are respectively wedge-fitted in complementary tapered openings in the elbow fitting 126 for communication, respectively, with the supply conduits 22 and 23, the valve tubes 70 extending forwardly between the side plates 115 and across the upper end of the receptacle 112.

A stop flange 129 is formed on the front of the support body 110 and receives thereagainst a spout 130 which has a retaining groove 131 on the top thereof. Formed in the spout 130 are two passages 132 (FIG. 10), having tapered portions in which are respectively received the forward ends of the flexible valve tubes 70 in wedge-fitted engagement. The passages 132 communicate with a mixing chamber 133 in the spout 130, which also has an internally threaded part 134 in which an aerator 135 is threadedly engaged. A flow re-strictor 137 may be clamped between the aerator 135 and the spout 130, all in a known manner.

The valve assembly 100 also includes a top housing 140 having a flat end wall 141 integral around the perimeter thereof with a depending skirt 142 which is disposed for overlapping engagement with the upper end of the lower housing 101. Depending from the end wall 141 are two retaining flanges 143 and 144 which are respectively receivable in the retaining grooves 127 and 131 for retaining the elbow fitting 126 and the spout 130 in place. Preferably, the end wall 141 rests upon the upper ends of the side plates 115, being secured thereto by fasteners 146 which are threadedly engaged with the attachment bosses 118 (see FIG. 11). Also integral with the end wall 141 are projecting upwardly therefrom substantially perpendicular thereto is a hub 145. The hub 145 has a cylindrical bore 147 extending axially therethrough, the bore 147 having an inner diameter substantially the same as that of the receptacle 112 and being aligned coaxialy with the receptacle 112 when the top housing 140 is mounted in place. The lower end of the hub 145 extends downwardly beneath the end wall 141 and is provided on the front and rear edges thereof with stop shoulders 148, against which the elbow fitting 126 and the spout 130 are respectively seated. The hub 145 is also provided with an annular stop shoulder 149 extending radially inwardly of the bore 147 at its outer end.

Slidably received in the aligned bore 147 and receptacle 112 coaxially therewith is an elongated control cam 150, which has a circular axial bore 151 extending therethrough. The cam 150 has a circularly cylindrical outer surface 152 and has a reduced diameter portion 153 at the upper end thereof defining an annular shoulder 154 (see FIGS. 9 and 12). Formed on the outer end of the control cam 150 is a reduced-diameter tubular tip 155 which is internally threaded. The lower or inner end of the control cam 150 has a cam surface 156 which is generally frustoconical in shape, and which, at its upper end, blends into the cylindrical surface 152.

In use, the control cam 150 is slidably received in the bore 147 and the receptacle 112, with the guide shaft 25 being fitted in the lower end of the axial bore 151 for sliding frictional movement with respect thereto, the guide shaft 125 serving to keep the control cam 150 accurately centered in the receptacle 112, while permitting rotational and axial movement thereof. The axial movement is facilitated by the vent bore 114, which prevents compression of trapped air in the receptacle 112. A cylindrical handle 160 is secured to the upper end of the control cam 150, the handle 160 having a circular web 161 provided with a cylindrical hub 162 in which the tip 155 of the control cam 150 is snugly received, the handle 160 being fixedly secured to the control cam 150 by a screw 163 which is engaged in the tip 155.

The operation of the valve assembly 100 will now be explained. It will be appreciated that the valve tubes 70 may be the same ones as were used in the dual control valve assembly 20, described in connection with FIGS. 1-7, above. The valve tubes 70 are slightly spaced apart so as to permit insertion of the control cam 150 therebetween. The control cam 150 is axially movable by means of the handle 160 between a retracted, fully closed condition, illustrated in FIGS. 9-11 and an extended, fully open condition, illustrated in FIGS. 12 and 13. The cam surface 156 has a conical angle which varies around the circumference of the control cam 150 in a known manner so that, when the control cam 150 is pulled out to its fully extended condition, it can be rotated about its axis to proportion the flow between the two valve tubes 70. In a central rotational position the cam surface 156 is barely in contact with the neck portions 75 of both of the valve tubes 70, so that both valve tubes 70 are in their fully relaxed condition, permitting maximum flow from both of the supply conduits 22 and 23. If the control cam 150 is then rotated about its axis, a portion of the cam surface 156 of decreasing conical angle will be brought into engagement with the neck portion 75 of one or the other of the valve tubes 70, depending on the direction of rotation, gradually compressing it to a fully closed position as the control cam 150 is rotated. It will be appreciated that for this closing operation, the neck portion 75 is pinched between the control cam 150 and the associated bearing surface 117 (see FIG. 10).

If it is desired to partially close both of the valve tubes 70, the control cam 150 is moved axially downwardly toward its fully retracted condition, the slope of the frustoconical cam surface 156 being such as to partially compress both of the neck portions 75. Again, rotation of the control cam 150 will selectively further close one or the other of the valve tubes 70. If it is desired to completely close both of the valve tubes 70, the control cam 150 is moved axially into its fully retracted position illustrated in FIG. 11, wherein the completely cylindrical outer surface 152 of the control cam 150 engages the neck portions 75 to pinch them entirely closed.

It will be appreciated that the valve assembly 100 has most of the advantages of the valve assembly 20, described above, which flow from the unique Venturi-like shape of the valve tubes 70. However, in this singlecontrol embodiment, the generally frustoconical shape of the cam surface 156 causes the upper diametrical half of the neck portion 75 (as viewed in FIG. 12) to close slightly before the lower half thereof, which can result in a teardrop-shaped opening. However, because of the reduced diameter of the neck portion 75, the movement between open and closed conditions occurs much more rapidly than in prior single control valves of the flexible tube type, thereby significantly reducing resultant turbulence and noise.

From the foregoing, it can be seen that there has been provided an improved valve assembly of the flexible tube type which is of relatively simple and economical construction, which greatly facilitates miniaturization of the valve assembly, which reduces the popout pressure exerted on the control member in a single-control embodiment, which minimizes turbulence and noise, which effectively prevents clogging with losse debris in the fluid stream and which, in a dualcontrol embodiment, affords quick and easy access to the valve tubes without the use of tools.

I claim:

1. A valve for controlling flow from a pair of pressurized fluid supply conduits, said valve comprising: a support, a pair of spaced resilient tubes carried by said support and respectively communicating with the supply conduits, each of said tubes having two end portions and a neck portion and two tapered transition portions respectively connecting said end portions to said neck portion, the inner surfaces of said end portions and said neck portion, the being circularly cylindrical and the inner surfaces of said transition portions being substantially frusto conical such that when the tube is relaxed the internal diameter of said neck portion is substantially less than that of either of said end portions each of said tubes having a circular internal cross-sectional flow area along the entire length thereof to promote laminar flow and to minimize noise, the cross-sectional flow area of said neck portion being substantially less than that through either of said end portions in use, and control means on said support engageable with said neck portions of said tubes and movable between a fully open position wherein said tubes are relaxed and closed positions cooperating with said support to pinch said neck portions for varying the internal cross-sectional areas thereof.

2. The valve of claim 1, wherein for each of said tubes the outer diameter of said neck portion is substantially less than that of either of said end portions.

3. The valve of claim 1, wherein each of said neck portions is dimensioned and arranged so that the external cross-sectional outline thereof never extends laterally beyond the external cross-sectional outline of either of said end portions during operation of said valve.

4. The valve of claim 1, wherein said control means includes a single control member disposed between said tubes for engagement with each.

5. The valve of claim 4, wherein said control member comprises an elongated cam member having a longitudinal axis, said cam member being axially movable and rotatable about said axis.

6. The valve of claim 1, wherein said control means includes a pair of control members respectively engageable with said tubes.

7. The valve of claim 1, wherein each of said neck portions is in the shape of a right circular cylinder.

8. The valve of claim 7, wherein each of said tubes includes two substantially frustoconical tapered portions respectively coupling said end portions to said neck portion.

9. The valve of claim 8, wherein said tapered portions have substantially equal conical angles and substantially equal axial extents.

10. A valve for controlling flow from a pair of pressurized fluid supply conduits, said valve comprising: a support, a pair of spaced resilient tubes carried by said support and respectively communicating with the supply conduits, each of said tubes having tow end portions and a neck portion and two tapered transition portions respectively connecting said end portions to said neck portion, the inner surfaces of said end portions and said neck portion being circularly cylindrical and the inner surfaces of said transition portions being substantially frusto conical such that when the tube is relaxed the internal cross-sectional area of said neck portion is substantially less than that of either of said end portions, each of said tubes having a circular internal cross-sectional flow area along the entire length thereof to promote laminar flow and to minimize noise, the cross-sectional flow area of said neck portion being substantially less than that through either of said end portions in use, and control means on said support engageable with said neck portions of said tubes and movable between a fully open position wherein said tubes are relaxed and closed positions cooperating with said support to pinch said neck portions for varying the internal cross-sectional area thereof, each of said neck portions being dimensioned and arranged so that the external cross-sectional outline thereof never extends laterally beyond the external cross-sectional outline of either of said end portions during operation of said valve.

11. The valve of claim 10, wherein said internal cross-sectional area of each of said neck portions is circular in shape when said tubes are relaxed.

12. The valve of claim 11, wherein each of said neck portions is in the shape of a right circular cylinder.

13. The valve of claim 12, wherein each of said tubes includes two substantially frustoconical tapered portions respectively coupling said end portions to said neck portion.

14. The valve of claim 13, wherein said tapered portions have substantially equal conical angles and substantially equal axial extents.

15. The valve of claim 10, and further including bearing surfaces on said support respectively engageable with said neck portions for laterally supporting same and for cooperation with said control means in the closed positions thereof for pinching said neck portions.

16. A dual-control mixing valve for controlling flow from a pair of pressurized fluid supply conduits to a spout assembly, said valve comprising: support means defining a receptacle therein, said support means including a cartridge assembly disposable in said receptacle in a mounted condition, said cartridge assembly including a cartridge body and a pair of spaced resilient tubes carried by said body and separated thereby so that said cartridge assembly is received in said receptacle and removable therefrom as a unit, first and second guide means respectively on said support means and cartridge body for cooperation to guide movement of said cartridge assembly accurately to and from its mounted condition and this permitting said cartridge assembly to be easily removable as a single unit upon removal of the spout assembly, said flexible tubes respectively providing communication between the supply conduits and the spout assembly when said cartridge assembly is disposed in its mounted condition in said receptacle, and two control members carried by said support means and engageable respectively with said tubes, each of said control members being movable between a fully open position wherein the associated tube is relaxed and closed positions cooperating with said cartridge body to pinch said tube for varying the internal cross-sectional area thereof.

17. The mixing valve of claim 16, and further including bearing surfaces on said cartridge body conforming to the axial curvature of the outer surfaces of said tubes for laterally supporting same and for cooperation with said control members in the closed positions thereof for pinching said neck portions.

18. The mixing valve of claim 16, wherein each of said control members is reciprocatively movable transversely of the associated tube.

19. The mixing valve of claim 18, and further including two rotatable means respectively threadedly coupled to said control members for effecting movement thereof between the fully open and closed positions thereof.

20. The mixing valve of claim 16, and further including a spout assembly disposable on said support means in a mounted condition communicating with said tubes and defining the outlet, said spout assembly being removable as a unit from said support means for exposing said cartridge assembly and permitting removal thereof from said receptacle, and further including retaining means manually threadedly engageable with said support means for retaining said spout assembly in its mounted condition.

* * * * *